US010977179B2

(12) United States Patent
Lieber et al.

(10) Patent No.: US 10,977,179 B2
(45) Date of Patent: Apr. 13, 2021

(54) SOLID STATE DRIVE CACHE EVICTION POLICY BY AN UNSUPERVISED REINFORCEMENT LEARNING SCHEME

(71) Applicant: Western Digital Technologies, Inc., San Jose, CA (US)

(72) Inventors: Opher Lieber, Revava (IL); Ariel Navon, Revava (IL); Alexander Bazarsky, Holon (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/453,179

(22) Filed: Jun. 26, 2019

(65) Prior Publication Data
US 2020/0104260 A1 Apr. 2, 2020

Related U.S. Application Data

(60) Provisional application No. 62/738,816, filed on Sep. 28, 2018.

(51) Int. Cl.
*G06F 12/0871* (2016.01)
*G06F 12/02* (2006.01)
*G06N 20/00* (2019.01)
*G06F 12/0893* (2016.01)

(52) U.S. Cl.
CPC ...... *G06F 12/0871* (2013.01); *G06F 12/0246* (2013.01); *G06F 12/0893* (2013.01); *G06N 20/00* (2019.01); *G06F 2212/214* (2013.01); *G06F 2212/7205* (2013.01)

(58) Field of Classification Search
CPC ............ G06F 12/0871; G06F 12/0246; G06F 12/0893; G06F 2212/7205; G06F 2212/214; G06F 12/126; G06F 2212/466; G06F 2212/1021; G06F 2212/502; G06F 2212/313; G06F 12/0868; G06F 2212/7201; G06N 20/00; G06N 3/006; Y02D 10/00
See application file for complete search history.

(56) References Cited

U.S. PATENT DOCUMENTS

| 8,140,766 | B2* | 3/2012 | Bell, Jr. ............... G06F 12/082 711/133 |
| 8,180,720 | B1* | 5/2012 | Kovacs ............... H04L 67/2842 706/47 |
| 8,924,647 | B1* | 12/2014 | Evans .................. G06F 12/127 711/122 |
| 9,852,076 | B1* | 12/2017 | Garg ..................... G06F 16/172 |

* cited by examiner

*Primary Examiner* — Zhuo H Li
(74) *Attorney, Agent, or Firm* — Patterson & Sheridan, LLP; Steven H. Versteeg

(57) ABSTRACT

A method and apparatus for cache management and eviction polices using unsupervised reinforcement learning schemes is disclosed.

12 Claims, 3 Drawing Sheets

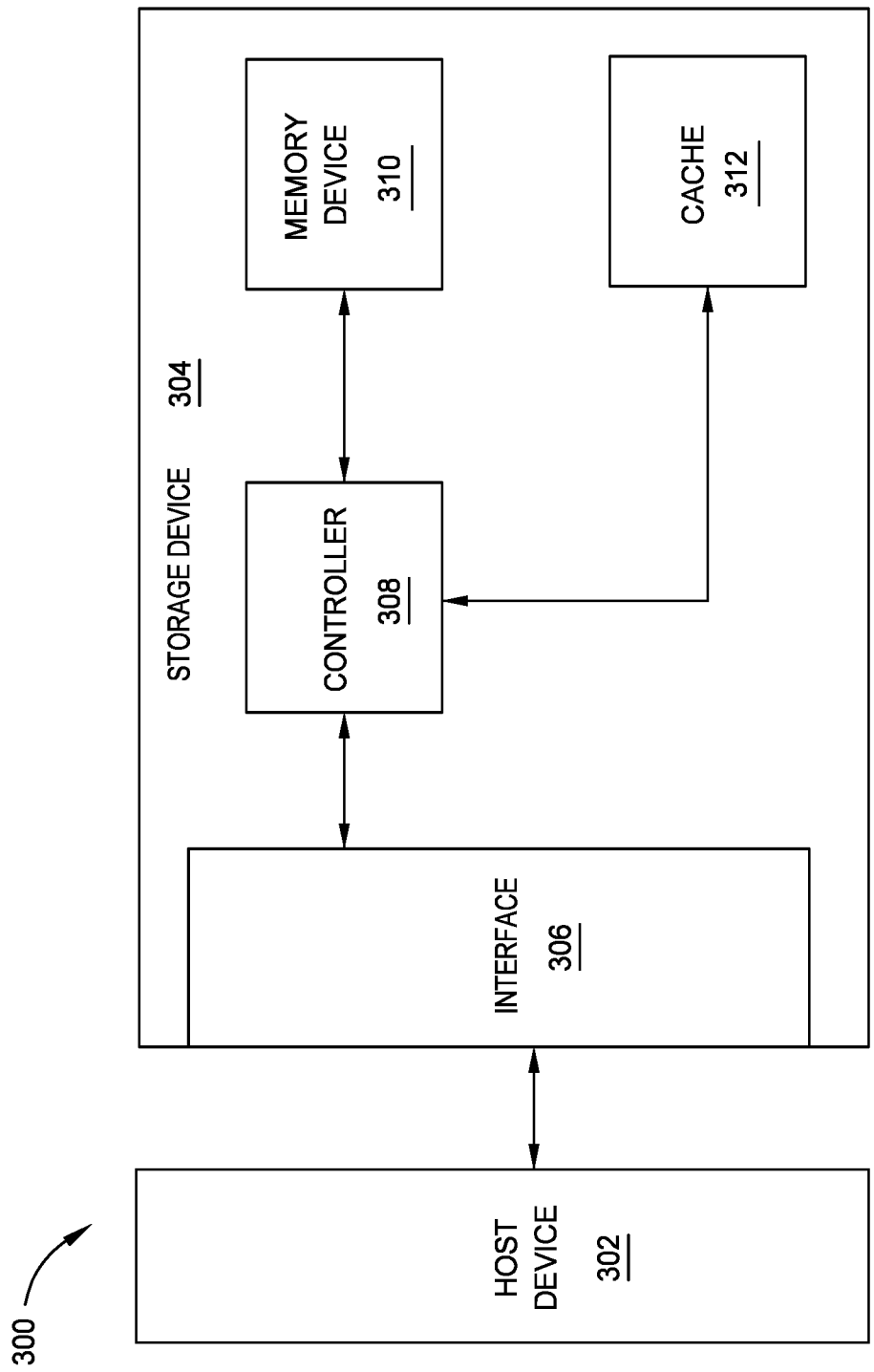

SOLID STATE DRIVE CACHE EVICTION POLICY BY AN UNSUPERVISED REINFORCEMENT LEARNING SCHEME

CROSS-REFERENCE TO RELATED APPLICATIONS

This application claims benefit of U.S. Provisional Patent Application Ser. No. 62/738,816, filed Sep. 28, 2018, which is herein incorporated by reference.

BACKGROUND OF THE DISCLOSURE

Field of the Disclosure

Embodiments of the present disclosure generally relate to solid state drives. More specifically aspects of the disclosure relate to eviction policies for caches for solid state drives.

Description of the Related Art

A logical to physical (L2P) cache is a basic part of solid state drive ("SSD") flash-management, which is typically used in order to avoid the need to perform two read operations from the NAND Flash per each host read request, due to the need to perform first the logical to physical address translation. Due to the limited size of the L2P cache, however, the cache needs to be managed in order to maximize the cache hit-rate and minimize the cache miss-rate. Today, a simple least recently used ("LRU") eviction policy is used, but this method is sub-optimal for many non-synthetic scenarios.

The optimization of the L2P cache is not a trivial problem. Decisions involving flash-management (e.g. cache eviction) have impacts not only in the present time, but also have long-term effects that are harder to optimize.

It is desired to optimize the L2P cache content according to longer term performance of the L2P cache hit rate.

SUMMARY OF THE DISCLOSURE

The present disclosure generally relates to cache management and eviction polices using unsupervised reinforcement learning schemes.

In one embodiment, a method for processing data is disclosed comprising: receiving a read command at a processing arrangement with an attached memory arrangement; checking a cache for a presence of data related to the read command received for processing; updating the cache with data related to the read command when the cache does not indicate a presence of data related to the read command and evicting data from the cache while updating the cache to maintain a defined size of the cache, wherein the evicting is done through reinforcement learning.

In another embodiment, an apparatus is disclosed comprising means for receiving a read command at a processing arrangement means with an attached memory arrangement means, means for checking a cache for a presence of data related to the read command received for processing, means for updating the cache with data related to the read command when the cache does not indicate a presence of data related to the read command and means for evicting data from the cache while updating the cache to maintain a defined size of the cache, wherein the evicting is done through reinforcement learning means.

In another embodiment, a method for processing data in a host with a solid state drive is disclosed comprising: receiving a read command at the solid state drive, checking a cache maintained in a controller for the solid state drive for a presence of data related to the read command received for processing, evicting a least relevant region of data from the cache when data from the read command is determined to be of greater importance and wherein the evicting is done through reinforcement learning; and updating the cache with data related to the read command when data from the read command is determined to be of greater importance than the lead relevant region of data that has been evicted.

In one embodiment, a storage device, comprises: a memory device; and a controller coupled to the memory device, the controller configured to: receive a read command; check a cache for a presence of data related to the read command received; update the cache with data related to the read command when the cache does not indicate a presence of data related to the read command; and evict data from the cache while updating the cache to maintain a defined size of the cache, wherein the evicting is done through reinforcement learning.

In another embodiment, a storage device, comprises: a memory device; and a controller coupled to the memory device, the controller configured to: initiate all give and take (L2P) parts to $V(k)=0$; read "i" cache hit; determine that there is no cache hit; query a value of $v(i)$ against $\min(v(k))$ in cache; determine that $v(i)$ is higher than $\min(v(k))$ in cache; replace coldest L2P cache region having minimal $V(k)$ with L2P part "i" from flash for current host read; and update L2P cache region and value $V(i)=(V(i)+1)$ for current read "i".

In another embodiment, a storage device, comprises: a memory device; and means for evicting data from the cache while updating the cache to maintain a defined size of the cache, wherein the evicting is done through reinforcement learning means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a schematic illustration of a storage system according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
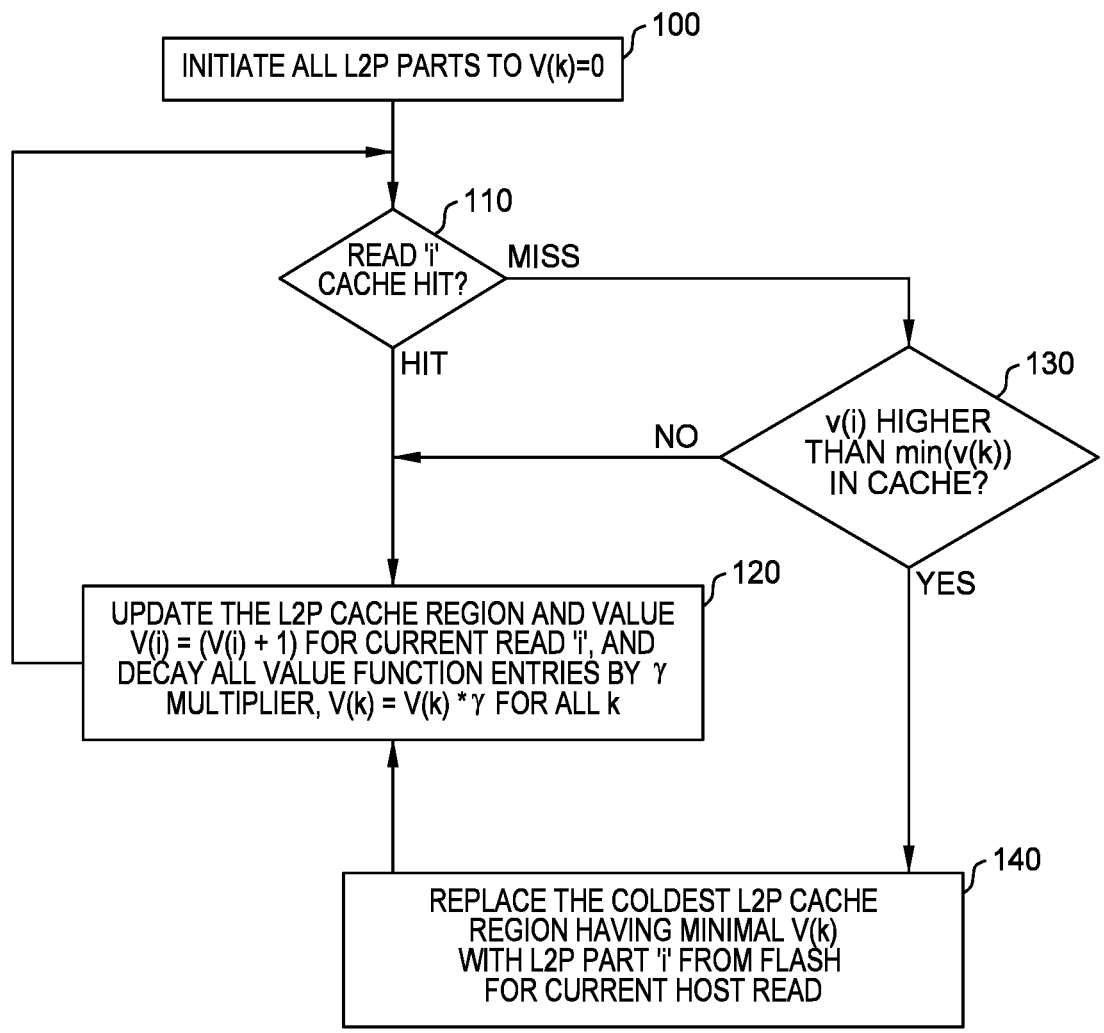
FIG. 1 is a flowchart for a simplified reinforcement learning method in accordance with an example embodiment of the disclosure.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Reinforcement learning (RL) is an area of machine learning concerned with how software agents ought to take actions in an environment so as to maximize some notion of cumulative reward. The problem, due to its generality, is studied in many disciplines, such as game theory, control theory, operations research, information theory, simulation-based optimization, multi-agent systems, swarm intelligence, statistics and genetic algorithms.

Reinforcement learning differs from standard supervised learning in that correct input/output pairs need not be presented, and sub-optimal actions need not be explicitly corrected. Instead the focus of reinforcement learning is on performance, which involves finding a balance between exploration (of uncharted territory) and exploitation (of current knowledge).

RL schemes use an agent that makes transitions between a set of states (S) performing a set of actions (A). The agent learns a transition probability Pa(S,S') that converges to the optimal policy, Pa*(S,S'), which is what is the best action, a*, the agent should do in any state. Each transition receives a reward Ra(S,S').

A reinforcement learning agent interacts with its environment in discrete time steps. At each time t, the agent receives an observation Ot, which typically includes the reward Ra(S,S'). The agent is then programmed to choose an action from the set of available actions, which is subsequently sent to the environment. The environment moves to a new state S' and the reward Ra(S,S') associated with the transition S→S'(a) is determined. The goal of a reinforcement learning agent is to collect as much reward as possible. The agent can choose any action as a function of the history. In order to act near optimally, the agent reasons about the long term consequences of its actions (i.e., maximize future income), although the immediate reward associated with this might be negative.

Reinforcement learning is particularly well-suited to problems that include a long-term versus short-term reward trade-off. It has been applied successfully to various problems, including robot control, elevator scheduling, telecommunications, backgammon, checkers and go (AlphaGo).

Two elements make reinforcement learning powerful: the use of samples to optimize performance and the use of function approximation to deal with large environments. Thanks to these two key components, reinforcement learning can be used in large environments in the following situations:
  A model of the environment is known, but an analytic solution is not available;
  Only a simulation model of the environment is given (the subject of simulation-based optimization);
  The only way to collect information about the environment is to interact with it.

The first two of these problems could be considered planning problems (since some form of model is available), while the last one could be considered to be a genuine learning problem. However, reinforcement learning converts both planning problems to machine learning problems.

State-Value Function Equations

Value function Vπ (S) is defined as the expected return starting with state S, i.e. So=S, and successively following policy Tr. Hence, roughly speaking, the value function estimates "how good" it is to be in a given state. An equation for the value function and the sum of future discounted reward is calculated by the RL scheme equations.

The algorithm finds a policy with maximum expected return. From the theory of MDPs it is known that, without loss of generality, the search can be restricted to the set of so-called stationary policies. A policy is stationary if the action-distribution returned by it depends only on the last state visited (from the observation agent's history). The search can be further restricted to deterministic stationary policies. A deterministic stationary policy deterministically selects actions based on the current state. Since any such policy can be identified with a mapping from the set of states to the set of actions, these policies can be identified with such mappings with no loss of generality.

Conventional storage device controllers do not use unsupervised RL schemes to learn the optimal policy of decision making related to the storage device management as discussed herein below for learning L2P cache eviction/management policy using a simplified RL scheme.

The present disclosure LRU eviction policy—L2P cache eviction policy is typically based on Least Recently Used (LRU) algorithm, where logical block address ("LBA") ranges that are not used for a long time are evicted from the cache. The drawback of the LRU algorithm is that the algorithm does not take into account repeating occurrences of LBA ranges, and therefore is prone to eviction of an LBA range just before it needs to be used again and hence an undesirable cache swapping may occur.

In one extension of the LRU mechanism, whenever a page is read from the storage controller, a global timestamp is updated and stores the number of read pages.

A timestamp is also kept for each L2P entry, which is updated every time this entry is read. In current some existing implementations, LRU L2P entries are only evicted and switched if the difference between the timestamp of the L2P entry and the global timestamp is larger than a defined threshold. This is to avoid frequent loads and unloads to the cache in use-cases where the cache cannot hold the entire host workload.

Aspects herein, however, provide an optimized L2P-eviction mechanism which is adapted to optimize long-term hit-rate performances of the L2P-cache in SSD storage devices. This is done by utilizing unsupervised RL schemes that are operated on-the-fly for learning the optimal policy for L2P cache eviction/management.

A simplified RL scheme where rewards are assigned according to cache hit/miss signals and the controller learns the optimal policy for L2P cache evictions based on a past success rate is discussed herein.

The simplified reinforcement learning method is described in a flowchart on FIG. 1. The basic steps are as follows:
  All L2P cache entries are initialized to value zero.
  Next, when a host read occurs, the L2P part value is updated and the region value function gets a +1 reward, while all L2P entries are multiplied/decayed by a reduction factor γ (smaller than but close to 1).

When a L2P cache miss occurs, the flash management FW is configured to sort the L2P cache entries and find the region with minimal value and to evict the region from the L2P cache if its value is lower than the L2P region that is read from the flash due to the L2P cache miss and load the new one to cache.

In another embodiment, this functionality may be accelerated by dedicated or not dedicated HW.

In 100, all L2P parts are initiated to V(k)=0. The method extends to 110 wherein if a read has been performed, a query is run to determine if there is a cache hit. If there is a cache hit, then the method progresses to 120 wherein the L2P cache region is updated. Moreover, the value V(i)=(V(i)+1) is updated for the current read I and decay of all value function entries by $\gamma$ multiplier, V(k)=V(k)*$\gamma$ for all k. The method then loops to 110 for another query.

If the query at 110 does not provide a hit on the cache, the method moves to a query at 130 wherein the v(i) value is checked against the min(v(k)) in the cache. If the v(i) value is not higher, then the method proceeds to 120. If the v(i) value is higher, then the coldest L2P cache region is replaced having minimal V(k) with L2P part "I" from flash for the current host read at 140. The method then proceeds to 120.

Figure 2:
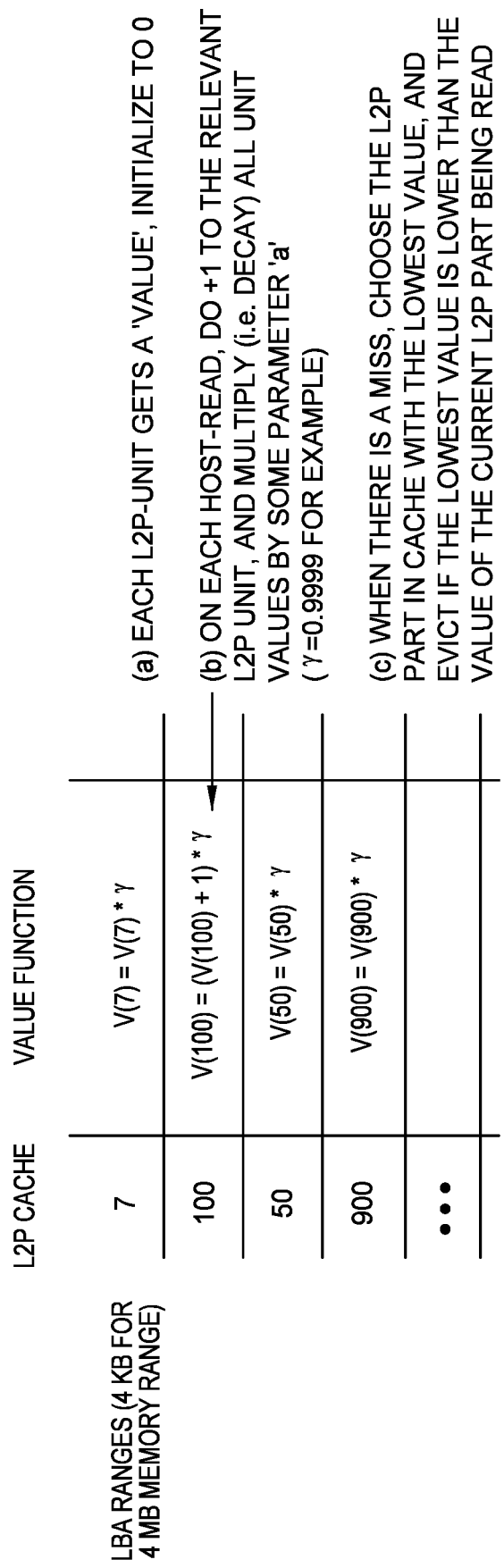
FIG. 2 is a chart of L2P Cache and value function.

Referring to FIG. 2, an example of the simplified design is shown with the stored value function estimations. The +1 reward addition is shown after a L2P cache hit to a region, and all regions are reduced by the $\gamma$ factor. The value function is a measure of the "temperature" of the region, where a smaller value means that the region is colder (fewer hits in the recent past, depending on $\gamma$).

Example Simulation Results

The algorithm was tested on a synthetic use-case with multiple frequency read regions using the following setup:

Cache capacity of 256 units.

Random host read from 2 regions of size 200 units each, with decreasing frequency in the 2nd region (See Figure #2 below of the read addresses over time).

When accessing a region, the host does a burst of between 1 to 128 random reads.

Table 1 illustrates simulation results of read address vs. time. Note that the higher hit rate the better. Additionally, in regard to L2P cache utilization, less cache loads are better, but are a less critical performance factor versus the hit-rate.

TABLE 1

Simulation Results

| | Hit Rate | Number of Cache Loads |
|---|---|---|
| Algorithm | 74.4% | 6840 |
| LRU Based | 71.7% | 28328 |
| Reference: LRU + Timestamp (current NAND method) | 53.3% | 259 |

The reference "LRU+Timestamp" method is the current NAND design as described in "previously used methods" and shows impaired performance in such a dynamic scenario.

The aspects of the disclosure demonstrate a dramatic hit-rate improvement versus reference LRU method, while also providing significant reducing the cache-loads.

The embodiments and aspects disclosed will improve the cache hit-rate while reducing the cache-loads and will provide a closer to optimal L2P eviction policy. These embodiments are also more robust and adaptable to a wider variety of non-synthetic real-world host scenarios, where the assumption that the LRU is the best to evict is not always the case.

This in turn will increase random read performance, reduce power and improve overall device endurance, as less reads of L2P parts are needed from the memory to conduct random reads.

FIG. 3 is a schematic illustration of a storage system 300 according to one embodiment. The storage system 300 includes a host device 302 and a storage device 304 that is coupled thereto. The storage device 304 includes an interface 306 that is coupled to the host device 402. The interface 306 is also coupled to a controller 308. The controller 308 is coupled to a memory device 310 and a cache 312.

In one embodiment, a method for processing data is disclosed comprising: receiving a read command at a processing arrangement with an attached memory arrangement; checking a cache for a presence of data related to the read command received for processing; updating the cache with data related to the read command when the cache does not indicate a presence of data related to the read command and evicting data from the cache while updating the cache to maintain a defined size of the cache, wherein the evicting is done through reinforcement learning.

In another example embodiment, the method may be performed wherein the memory arrangement is a solid state drive.

In a further example embodiment, the method may be performed wherein the cache is maintained by the processing arrangement.

In a further example embodiment, the method may be performed wherein the reinforcement learning is performed unsupervised.

In a further example embodiment, the method may be performed wherein an optimal policy is generated through the reinforcement learning wherein a past success rate is used to generate the policy.

In a further example embodiment, the method may be performed wherein the checking the cache for a presence of data related to the read command received for processing includes sorting cache entries.

In a further example embodiment, the method may be performed wherein the sorting of the cache entries determines a region of the cache with minimal value and compares the minimal value with a value of data received with the read command and the updating the cache only occurs when the region of the cache with minimal value is less than the value of the data received with the read command.

In another embodiment, an apparatus is disclosed comprising means for receiving a read command at a processing arrangement means with an attached memory arrangement means, means for checking a cache for a presence of data related to the read command received for processing, means for updating the cache with data related to the read command when the cache does not indicate a presence of data related to the read command and means for evicting data from the cache while updating the cache to maintain a defined size of the cache, wherein the evicting is done through reinforcement learning means.

In a further example embodiment, the apparatus may be configured wherein the memory arrangement means is NAND based.

In a further example embodiment, the apparatus may be configured wherein the cache is maintained by the processing arrangement means.

In a further example embodiment, the apparatus may be configured wherein the reinforcement learning is performed unsupervised.

In a further example embodiment, the apparatus may be configured wherein an optimal policy is generated through the reinforcement learning wherein a past success rate is used to generate the policy.

In a further example embodiment, the apparatus may be configured wherein the checking the cache for a presence of data related to the read command received for processing includes sorting cache entries.

In another example embodiment, the apparatus may be configured wherein the means for sorting of the cache entries determines a region of the cache with minimal value and compares the minimal value with a value of data received with the read command and the updating the cache only occurs when the region of the cache with minimal value is less than the value of the data received with the read command.

In another embodiment, a method for processing data in a host with a solid state drive is disclosed comprising: receiving a read command at the solid state drive, checking a cache maintained in a controller for the solid state drive for a presence of data related to the read command received for processing, evicting a least relevant region of data from the cache when data from the read command is determined to be of greater importance and wherein the evicting is done through reinforcement learning; and updating the cache with data related to the read command when data from the read command is determined to be of greater importance than the lead relevant region of data that has been evicted.

In another embodiment, a method for maintaining data in a cache indicative of data contained in a memory arrangement is disclosed comprising: receiving a command at a controller for the memory arrangement, checking a cache maintained by the controller for the memory arrangement for a presence of data related to the command received for processing, evicting a least relevant region of data from the cache when data from the command is determined to be of greater importance than the least relevant region of data and wherein the evicting is done through reinforcement learning and updating the cache with data related to the command when data from the command is determined to be of greater importance than the least relevant region of data that has been evicted.

In one embodiment, a storage device, comprises: a memory device; and a controller coupled to the memory device, the controller configured to: receive a read command; check a cache for a presence of data related to the read command received; update the cache with data related to the read command when the cache does not indicate a presence of data related to the read command; and evict data from the cache while updating the cache to maintain a defined size of the cache, wherein the evicting is done through reinforcement learning. The memory arrangement is a solid state drive. The cache is maintained by the controller. The reinforcement learning is performed unsupervised. An optimal policy is generated through the reinforcement learning wherein a past success rate is used to generate the policy. The checking the cache for a presence of data related to the read command received includes sorting cache entries. The sorting of the cache entries determines a region of the cache with minimal value and compares the minimal value with a value of data received with the read command and the updating the cache only occurs when the region of the cache with minimal value is less than the value of the data received with the read command.

In another embodiment, a storage device, comprises: a memory device; and a controller coupled to the memory device, the controller configured to: initiate all L2P parts to $V(k)=0$; read "i" cache hit; determine that there is no cache hit; query a value of $v(i)$ against $\min(v(k))$ in cache; determine that $v(i)$ is higher than $\min(v(k))$ in cache; replace coldest L2P cache region having minimal $V(k)$ with L2P part "i" from flash for current host read; and update L2P cache region and value $V(i)=(V(i)+1)$ for current read "i". The controller is also configured to decay all value function entries by $\gamma$ multiplier, $V(k)=V(k)*\gamma$ for all k. The controller is further configured to determine that there is a cache hit. The controller is further configured to update the L2P cache region after determining that there is a cache hit. The controller is further configured to determine that $V(i)$ is not higher than $\min(v(k))$ in cache. The controller is further configured to update the L2P cache region after determining that (i) is not higher than $\min(v(k))$ in cache. The controller is further configured to read "i" cache hit after updating the L2P cache region.

In another embodiment, a storage device, comprises: a memory device; and means for evicting data from the cache while updating the cache to maintain a defined size of the cache, wherein the evicting is done through reinforcement learning means. The storage device further comprises means to determine whether there is a cache hit. The storage device further comprises means to replace coldest L2P cache region having minimal $V(k)$ with L2P part "i" from flash for current host read. The storage device further comprises means to initiate all L2P parts to $V(k)=0$. The storage device further comprises means to check a cache for a presence of data related to the read command received. The storage device further comprises means to update L2P cache region and value $V(i)=(V(i)+1)$ for current read "i".

While the foregoing is directed to embodiments of the present disclosure, other and further embodiments of the disclosure may be devised without departing from the basic scope thereof, and the scope thereof is determined by the claims that follow.

What is claimed is:
1. A storage device, comprising:
 a memory device;
 a logical to physical (L2P) cache comprising a plurality of L2P-units, each of the plurality of L2P-units having a value function;
 a controller coupled to the memory device and to the L2P cache, the controller configured to:
  initialize each of the plurality of L2P-units at an initial value function of zero;
  receive a read command;
  determine whether one of the plurality of L2P-units of the L2P cache is related to the read command received;
  determine another one of the L2P-units having a lowest value function in the L2P cache;
  determine whether a new L2P-unit has a value function higher than the lowest value function of the another one of the L2P-units in the L2P cache;
  replace the another one of the L2P-units with the new L2P-unit; and
  update the value function of the new L2P-unit to include a reward.
2. The storage device of claim 1, wherein the controller is further configured to decay the value function of each of the plurality of L2P-units by $\gamma$ multiplier after the value function of the new L2P-unit is updated to include the reward.

3. The storage device of claim 1, wherein the controller is further configured to, after determining the one of the plurality of L2P-units of the L2P cache is related to the read command received, update the value function of the one of the plurality of L2P-units of the L2P cache with a second reward.

4. The storage device of claim 1, wherein the controller is further configured to, after determining that the value function of the new L2P-unit is not higher than the lowest value function of the another one of the L2P-units in the L2P cache, keep the another one of the L2P-units in the L2P cache.

5. A storage device, comprising:
  a memory device;
  a logical to physical (L2P) cache comprising a plurality of L2P-units, each of the plurality of L2P-units having a value function; and
  a controller means for updating the L2P cache to maintain a defined size of the L2P cache, wherein the controller means is configured to:
    determine whether there is a cache hit;
    evict one of the plurality of L2P-units through reinforcement learning means for determining that the one of the plurality of L2P-units has a lowest value function; and
    the one of the plurality of L2P-units with a new L2P-unit for a current host read.

6. The storage device of claim 5, wherein the controller means is further configured to initiate the value function of each of the plurality of L2P-units to zero.

7. The storage device of claim 5, wherein the controller means is configured to determine whether there is a cache hit in response to a read command received.

8. The storage device of claim 5, wherein a value function of the new L2P-unit includes a reward.

9. A method of updating a logical to physical (L2P) cache comprising a plurality of L2P-cache units of a storage device, the method comprising:
  initializing an initial value function of each of a plurality of L2P-units to zero;
  receiving a read command;
  determining whether one of the plurality of L2P-units of the L2P cache is related to the read command received;
  determining another one of the L2P-units having a lowest value function in the L2P cache;
  determining whether a new L2P-unit has a value function higher than the lowest value function of the another one of the L2P-units in the L2P cache;
  replacing the another one of the L2P-units with the new L2P-unit; and
  updating the value function of the new L2P-unit to include a reward.

10. The method of claim 9, further comprising decaying the value function of each of the plurality of L2P-units by $\gamma$ multiplier after the value function of the new L2P-unit is updated with the reward.

11. The method of claim 9, further comprising, after determining the one of the plurality of L2P-units of the L2P cache is related to the read command received, updating the value function of the one of the plurality of L2P-units of the L2P cache with a second reward.

12. The method of claim 9, further comprising, after determining that the value function of the new L2P-unit is not higher than the lowest value function of the another one of the L2P-units in the L2P cache, keeping the another one of the L2P-units in the L2P cache.

* * * * *